United States Patent [19]
Bourke

[11] Patent Number: 5,413,091
[45] Date of Patent: May 9, 1995

[54] SOLAR COLLECTOR WITH FREEZE DAMAGE PROTECTION

[75] Inventor: Brendan V. Bourke, Stanmore, Australia

[73] Assignee: Rheem Australia Limited, Rydalmere, Australia

[21] Appl. No.: 170,343

[22] PCT Filed: Jul. 24, 1992

[86] PCT No.: PCT/AU92/00384
§ 371 Date: Jan. 4, 1994
§ 102(e) Date: Jan. 4, 1994

[87] PCT Pub. No.: WO93/02327
PCT Pub. Date: Feb. 4, 1993

[30] Foreign Application Priority Data
Jul. 24, 1991 [AU] Australia ............... PK7384

[51] Int. Cl.⁶ .................................. F24J 2/40
[52] U.S. Cl. .................... 126/598; 126/588; 126/663
[58] Field of Search ............ 126/598, 599, 588, 589, 126/651, 652, 655, 670, 672, 662, 694, 663, 664

[56] References Cited
U.S. PATENT DOCUMENTS

| | | | |
|---|---|---|---|
| 4,011,858 | 3/1977 | Hurkett | 126/694 |
| 4,308,856 | 1/1982 | Durand et al. | 126/598 |
| 4,474,172 | 10/1984 | Burke | 126/598 |
| 4,611,577 | 9/1986 | Clegg | 126/670 |
| 5,143,053 | 9/1992 | Baer | 126/662 |

*Primary Examiner*—James C. Yeung
*Attorney, Agent, or Firm*—Learman & McCulloch

[57] ABSTRACT

A flat plate solar collector (10) of the header/riser type housed in a glazed collector enclosure (14) and having liquid conduits comprising risers (24) intercommunicating with headers (22, 26) at both ends of the risers. The risers are tapered and the headers are surrounded by full heat insulation (28, 30) as defined. The tapering of the risers is effective to prevent bursting of any riser occasioned by freezing of a working liquid especially for example potable water contained therein, by promotion of initial freezing in a localized region of the riser around its minimum cross-sectional area (32) followed by progressive travel of the freezing of the working liquid in the riser in a direction away from the localized region. The full heat insulation is effective to substantially delay total freezing of all the liquid in the headers.

17 Claims, 4 Drawing Sheets

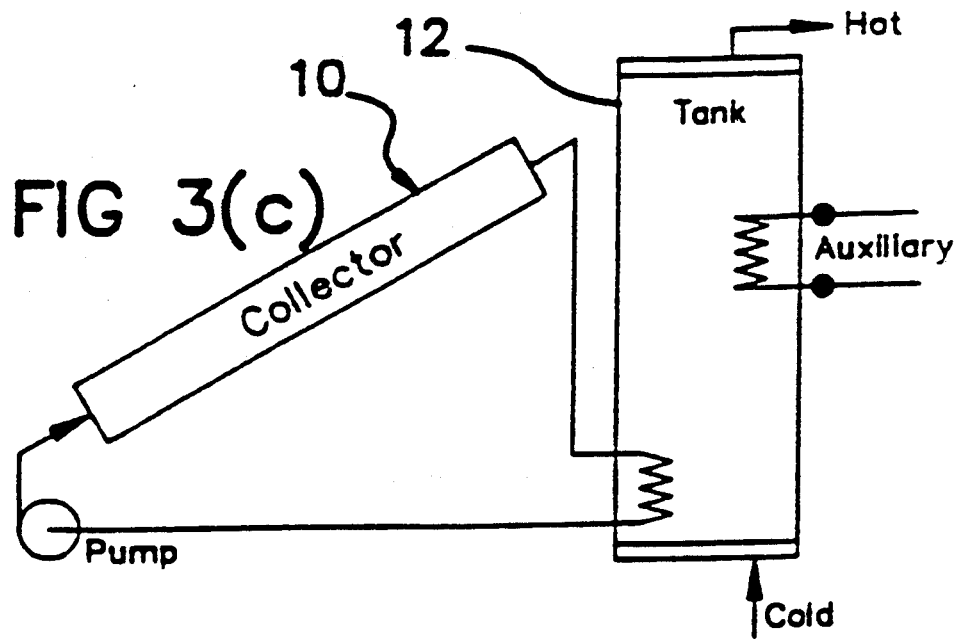
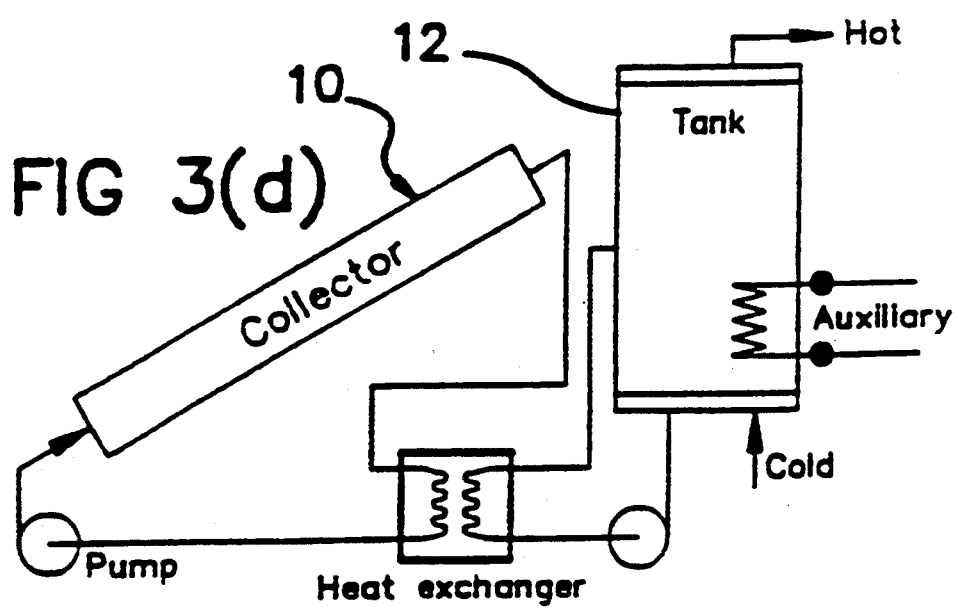

SOLAR COLLECTOR WITH FREEZE DAMAGE PROTECTION

BACKGROUND

This invention relates to solar energy collectors having means to avoid the bursting of liquid ways in such collectors caused by freezing of liquid contained therein. Without some form of protection, conventional flat plate solar liquid heaters are subject to damage when exposed to temperatures low enough to cause the heat transfer fluid in the collector to freeze solid. Most already adopted methods for overcoming this problem are not fail-safe. Even if the potential of a collector to freeze is only expected as a rare event, collectors require means to either avoid or protect them against the possibility of freezing. Sub-zero ambient temperatures during periods of no solar radiation can readily result in plate and liquid way temperatures below zero. Even where ambient temperatures fall only as low as 5° C., water filled collectors can freeze due to radiant heat loss to a clear night sky. This effect is observed quite commonly in inland areas at times when low humidity in the air leads to high clarity of the sky, hence high radiant heat loss from a collector.

Freeze protection can be provided by draining the liquid from the collectors, use of antifreezing solutions or warming the liquid in the collectors. These known methods work on the principle of avoiding freezing but have disadvantages. For instance, when an antifreeze solution is used in the collector loop it requires a heat exchanger between the collector and the storage tank. Common antifreeze liquids are ethylene glycol-water and propylene glycol-water solutions. Ethylene glycol is toxic as are some commonly included corrosion inhibitors and most plumbing codes require the use of two metal interfaces between the toxic fluid and the potable water supply. This can be accomplished by use of double walled heat exchangers that may take the form of coils in the water storage tank or external to the tank. Either way entails additional cost. Furthermore, glycols decompose over the extended lifetime expected of solar collectors and require replacement, hence further cost.

Alternatively, air can be used as the heat transfer fluid in the collector heat exchanger loop. Whilst no toxic fluids are involved and no double-walled heat exchanger interface is needed, the disadvantage of air heating collectors is their lower effectiveness than liquid heating collectors.

Another method of freeze protection where potable water is used throughout the tank and collector system, is to pump warm water from the storage tank through the collector when necessary to keep it from freezing. This is disadvantaged by thermal losses from the system being significantly increased and an additional control mode must be provided. In emergencies, when pump power is lost, the collector and piping subject to freezing must be drained, requiring a further control means.

A further method adopted is based solely on draining water from the collectors when they are not operating. Since this usually involves draining heated liquid to waste, it detracts from the effectiveness of the collector system as a whole and adds to running costs. Again, a control mode is required which is not fail-safe.

A fifth method is to design the collector plate and piping so that it will withstand freezing. For example, designs have been proposed using butyl rubber risers and headers that can expand if water freezes in them.

Another example of such a passive method of coping with freezing and avoiding bursting of conduits is disclosed in lapsed Australian patent application number 75412/81 of C. D. Doughty. The Doughty invention involves the use of differential heat extracting means associated with each conduit, preferably the extracting means being tapered fins or "flanges" as referred to by Doughty. This way freezing is said to occur progressively from one end of each exposed conduit to the other end and expansion due to freezing occurs out of that other end.

The Doughty apparatus and method suffers a penalty in that the fins disclosed associated with riser type conduits are considerably tapered and, as such, a significant loss of potential flat plate area for solar absorption is lost. Given that it is nearly always desirable to fit a solar collector into an insulated enclosure with a glass or similar transparent layer to enclose the skyward facing surface of the collector, thus to avoid otherwise very significant convective heat loss, it is usually advantageous or necessary to keep the insulated enclosure to a minimum size. The Doughty invention would thus tend to require a significantly increased size collector enclosure because of the loss of usable plate area for absorption of insolation. C. D. Doughty has addressed this problem in a later patent application (GB 2117110A) in which it is said that effective freeze protection can be achieved by associating the tapered flange or fin with both header conduits only in which case it is unnecessary to use other than conventional riser conduits. This assertion is further discussed below. The substantial taper disclosed is indicative of the disadvantage associated with the fact that the heat transfer mechanism of a flat plate or a tapered fin such as described in a glazed enclosure is radiant rather than convective. The purpose of the enclosure is to suppress convection. In actual service as opposed to a normal contrived freeze chamber test situation an enclosed solar collector at risk of freezing is most likely to be in a situation where the glass of the collector box is at a temperature not much below 0° C., the ambient air temperature above the collector being possibly as high as 5° C. The predominant heat transfer by radiation from the fin (or plate) to the collector glazing is by virtue of the temperature difference between the glazing and the plate which is almost certainly extremely small. Thus merely a small amount of fin taper would be insufficient to provide for the mechanism of progressive linear ice formation proposed by Doughty.

In the Doughty specification the effectiveness of the freeze protection disclosed was justified on the basis of a demonstration test in a blast freezing apparatus cooled to −40°. The specification is silent as to whether the test was carried out with the collector panel enclosed in a glazed and insulated enclosure or not. Either way the test might falsely give the impression that the tapered fin construction was more effective than it really would be in practice. On one hand, if not in a collector enclosure, the apparatus would be likely to provide a much greater proportion of convective heat transfer via the fins extending from the liquid conduits. Such a large contribution of convective heat transfer cannot be anticipated in the usual situation where the collector is housed in an insulated glazed enclosure. If, on the other hand, the test were carried out with the apparatus in a collector enclosure, the temperature difference between the glazing and the fins or flanges would be much greater in the described test situation (i.e. about 40° C.) than in practice and so radiant heat transfer from the fins would be given a much larger effect than it would in the normal practical situation. Thus the test situation would increase greatly the likelihood of the tapered fin concept appearing to work as intended, but artificially so. In actual practice the tapered fin idea is too sensitive to spurious small variables to be reliable.

The present invention has been made whilst re-evaluating the concept of total passive protection and the linear progressive freezing of conduits concept as described by Doughty. Also, the present invention seeks to obtain these advantages whilst making use of metallic conduits as distinct from resilient plastics conduits (elsewhere mentioned in other prior art) for the liquid passages in the collector because of the good heat conduction available in metals. The present invention would most likely be advantageous when embodied in liquid conduits of copper, aluminium or corrosion protected steel. However, it could also be applied to collectors made from the majority of commodity plastics materials. These do not possess adequate low temperature resiliency to the extent that they can rely on inherent stretching ability to cope with freezing in a solar collector context.

In common with the Doughty specifications referenced, the present invention would be most likely to be applicable in collectors of the flat plate type having liquid conduits of the header and interconnecting riser type. It would be applicable also to equivalent constructions whether formed by joining tubular members or by inflating straight unbonded passageways between otherwise bonded opposing plates. Such "roll bonded" types feature a single inlet/single outlet joined by branched flow channels, made by roll welding double sheets or either aluminium or copper, and are subjected subsequently to internal pressure to expand the tubes. Any of the types of solar collector referred to in this paragraph would comprise types referred to in this specification and claims as being "of the type described" and would include such collectors when enclosed, in the commonplace manner, in glazed enclosures and insulated below the underside and around the edges of the solar absorbing plate (or finned tubes).

A key matter relates to the method of proving the effectiveness of this invention versus other systems in a simulated test environment. An observation made by the present inventor was that conventional flat plate collectors of the type described filled with potable water and in normal service would fail by bursting of risers even when ambient temperatures fell overnight to 5° C., especially in relatively low populated inland climates where night sky clarity was high. Despite this, identically configured collectors could not be made to fail when simply installed for 3 days in a fan forced freezing chamber in which the air temperature was controlled to −15° C. This led to a suspicion that the test method used by Doughty may not be indicative that the disclosed arrangements would be sufficiently effective in the environments where ice formation in conventional collectors would be very rapid. In the inventor's freeze chamber experiments on collectors of the type described and even on serpentine shaped planar flat plate collectors having a liquid path comprising 10 meters of copper tube in a single length, whilst total freezing of the collector ways could be readily induced, bursting failure could not.

Accordingly, an effective testing arrangement was devised that did enable actual in-service failures to be simulated in the experimental freezing chamber. This enabled the effectiveness of the present invention to be refined and reliably proved in a more expeditious manner than by outdoor field testing. The tests required a radiant heat sink to be installed parallel to and above the collector assembly being tested. The radiant heat sink had a generally planar form and was positioned about 500 mm distant from the collector. The heat sink comprised a 20 m long copper tube formed into a zig-zag or serpentine shape and affixed to a copper plate. The face of the heat sink opposite to the side facing the collector was heat insulated. During testing, a liquid at a temperature of −25° to −30° C. was circulated through the heat sink's copper tube. This arrangement was found to simulate the field test condition of the collector experiencing in effect a black body radiant heat target 5° C. below that of the ambient air temperature and enabled the rapid heat loss and ice formation that caused the busting of the conventional risers in collectors of the type described to be experimentally duplicated.

SUMMARY OF THE INVENTION

The invention consists of a flat plate solar collector of the type described houseable in a glazed collector enclosure and having, in combination, liquid conduits comprising one or more risers communicating with headers at both ends of the risers, the risers being tapered and the headers being surrounded by full heat insulation as herein defined, the tapering of the risers being effective to prevent bursting of any riser occasioned by freezing of a working liquid contained therein by promotion of initial freezing in a localised region of the riser around its minimum cross-sectional area followed by progressive travel of the freezing of the working liquid in the riser in a direction away from said localised region; and said full heat insulation being effective to substantially delay total freezing of all the working liquid contained in the headers.

Preferably the risers have a minimum cross-sectional area located intermediate the ends. Mainly for ease of manufacture, the taper of the risers may be linearly uniform. In a preferred form any one riser may have a minimum cross-sectional area at its centre and a maximum cross-sectional area at either end.

One preferred version may have each riser in the shape of a pair of conical tubes extending co-linearly in opposite directions from a common minimum cross-sectional area between the ends to larger cross-sections at the ends. In an alternative preferred embodiment the risers may be each a tube having a single conical form having its minimum cross-sectional area at one end. In such an embodiment the minimum cross-sectional area of each riser is located at the point of intersection of the riser with the lower header but alternatively may be located at the point of intersection of the riser with the upper header or may be located every alternate intersection between each riser and any one of the headers.

Demonstrated effective results have been shown where the maximum cross-sectional area of the risers is in the preferable range of 2 to 4 times that of the minimum cross-section.

The headers of the collector have been shown to be at least highly resistant to prolonged freezing when the cross-sectional area of the headers is equivalent to that of at least 25 mm bore cylindrical tube. The header protection may be maximised when they are housed inside the collector enclosure. It is preferred that a blanked-off end of any one header has a tapered, conical plug extending inwardly into said header from the said end to a distance not beyond a point at which a riser closest to the said end intersects with said header. This controls ice formation in a way effective to further protect the header from potential damage.

It is particularly preferred that at least one fully insulated header is further enclosed by radiation shielding means, which may comprise a pair of spaced apart sheets, ideally stainless steel.

BRIEF DESCRIPTION OF THE DRAWINGS

The invention is described with reference to the accompanying illustrations showing a particularly preferred example of the invention and variations thereof.

In the illustrations:

FIG. 4 (a) is a partial cross-section, 4 (b) a cross-section and 4 (c) a broken perspective.

DETAILED DESCRIPTION

Figure 1:
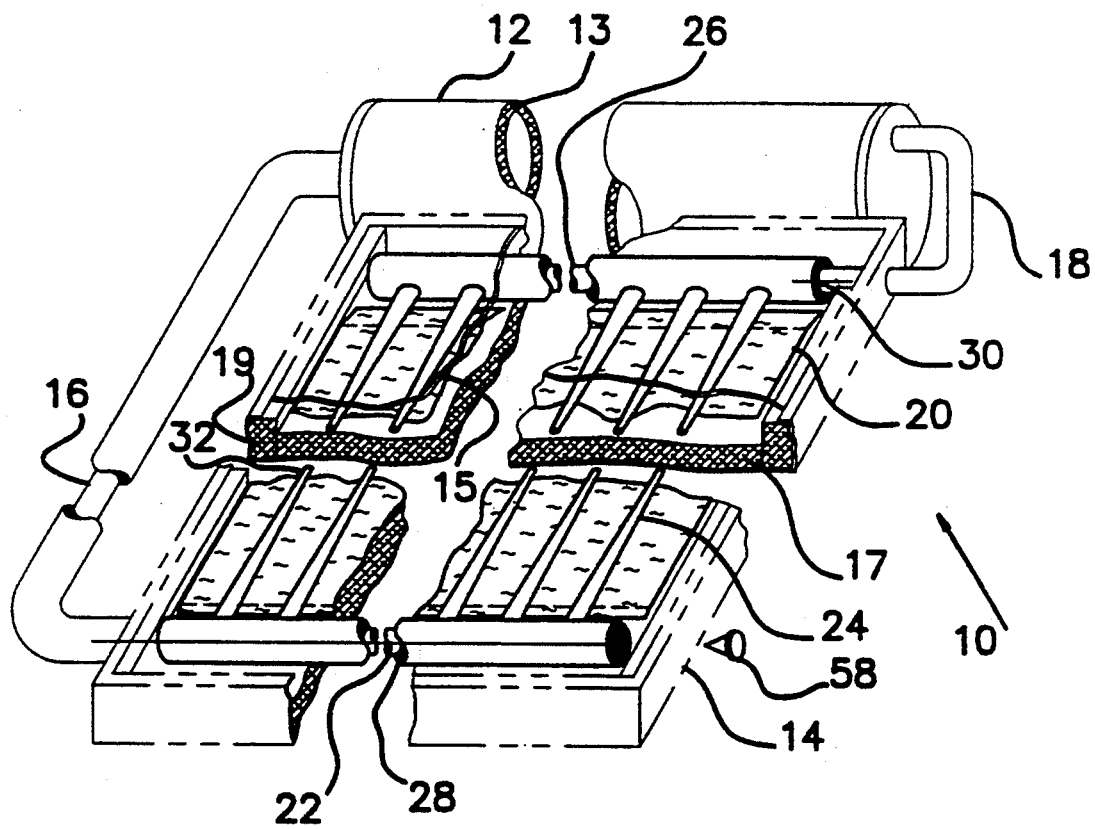
FIG. 1 is an unscaled top perspective view of a collector according to the present invention, the collector being installed as normal in an insulated and glazed enclosure, various parts being shown in broken or cutaway view to illustrate the construction. The collector is shown connected to a storage tank as part of a water heating system.

In FIG. 1 the collector (10) is depicted as being closely coupled to a tank (12) enclosed in a layer of heat insulation (13). The collector (10) is mounted close to a tank (12) just above the level of the inclined collector. Conventional aspects of the collector include the enclosure (14), top glazing (15), insulated inlet pipe (16), insulated outlet pipe (18) and working liquid conduits of the header and riser construction principle where the headers are an upper and a lower pipe or tube mounted generally horizontally and the risers are a group of pipes or tubes parallel to each other and joining the upper and lower headers to form a parallel array. The parallel array is arranged at a suitable angle of inclination when installed, often chosen as making an angle with the horizontal approximately equal to the map latitude where installed. Also conventional is a flat heat absorption plate (20) to which the riser tubes are bonded in highly thermally conductive contact. The plate has "back" heat insulation (17) underneath it and edge heat insulation (19). For the sake of illustrative convenience, in FIG. 1 the longitudinal axes of the riser tubes and the headers are shown as lying in the plane of the plate (20). Other constructions where the riser tubes lie entirely above or below the plane of the plate are equally likely to be applicable to the present invention. It is more convenient to illustrate the significant aspects of the present invention if the risers are visible when looking on a downward perspective of the collector as in FIG. 1. The position of the storage tank or whether the system relies on natural or forced working liquid flow is not material to the inventive concept. Nor is it material whether the working liquid is potable water or a secondary heat exchange liquid although significant rationale underlying the invention is its enablement of economies following upon the simplicity of a potable water system not requiring previously used expensive "active" freeze protection means.

Features of particular significance in the context of the present invention as illustrated in FIG. 1 are the full heat insulation (as will be more fully explained) surrounding both the lower header pipe (22), and the upper header pipe (26). The specific shape of the risers (24) is also significant. Lower header pipe (22) is enclosed in a full layer of heat insulation material (28) whilst upper header pipe (26) is similarly enclosed in a full layer of heat insulation (30). Given that the normal housing of uninsulated headers in a glazed enclosure would constitute "partial" heat insulation (i.e. insulated against significant convective heat loss) the expression "full heat insulation" in this specification means a totally opaque layer of a heat insulation material such as a cellular polymer material in moulded or wrap-around blanket form, mineral wool, glass wool or the like. Suitable commercially available materials include foamed polyethylene having a coefficient of thermal conductivity of 0.042 watts per meter per degree Kelvin or foamed polyurethane (0.023 W/m/°K.).

Each riser tube (24) is here formed from initially cylindrical tubing to have a minimum cross-sectional area (32) intermediate its ends at what may be approximately its midpoint. Each riser (24) conveniently may Increase uniformly in cross-sectional area from its minimum to both ends. The illustration is intended to depict a straight linear (conical) enlargement but a non-linear variation may be at least equally effective. Where each riser at its ends intersects with the lower and upper header tubes, the intersection is enclosed in the heat insulation layer surrounding each header. Insulated header pipes (22) and (26) are illustrated as being enclosed within the glazed enclosure (14) but this need not be so. Each header could be mounted outside of the glazed enclosure but for reasons including general handling and installation convenience the internal positioning of the headers would be generally preferred. If outside, the headers having the full heat insulation layers (28), (30) would be substantially as effective as if inside the glazed enclosure (14).

Figure 2:
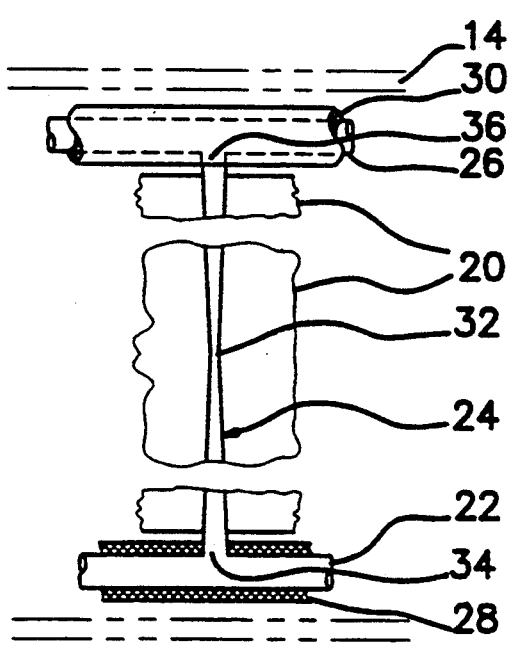
FIG. 2 is an unscaled fragmental view of a portion of the collector shown in FIG. 1.

Features of the invention are illustrated schematically in a larger not to scale fragmental view in FIG. 2, the components being correspondingly numbered to FIG. 1. As seen in FIG. 2, the risers (24) intersect with the lower header (22) at intersection point (34) and with the upper header (26) at intersection point (36). In the illustration, the riser (24) is conically expanded to cross-sectional maxima at the ends. An included cone angle for each conical section of the riser may be typically 1° but may be as small as 0.2° up to as much perhaps as 2° in practice. There need be no strictly nominated upper limit to the cone angle but greater angles would provide reduced resistance for frozen working liquid to expand in the riser but may tend to be harder to manufacture. In a typical solar collector, the length of the riser tube (24) would be 1.7 meters and in a riser within the scope of this invention the minimum bore diameter at the centre of the tube might conveniently be in the range of 8 to 12 mm with a diameter at the ends typically 16 to 20 mm. A suitable 1.7 meter long riser (24) has a bore diameter at the midpoint of 10 mm and at each end of 16 mm. If the risers are expected to suffer formation of scale on the internal surfaces in time, a larger cone angle (or equivalent) may be preferred.

At conditions of non-flow in the collector at times of incipient freezing of the working liquid in the riser, the point of minimum cross-sectional area (32) of the riser (24) behaves very selectively in the localisation of initiation of freezing.

The rate of solidification of the liquid contained in the risers is very much governed by the rate at which the relevant heat transfer processes at or about 0° C., in the case of water, can extract heat energy from the water to cause firstly a temperature fall to 0° C. and then the extraction of the latent heat energy of fusion preceding ice formation. The differing masses of water in each incremental length of the riser tube is the significant variable governing the relative rate of solidification along the riser. Since the mass of water contained in equal length increments of the riser tube of the invention varies according to the average cross sectional area of that increment so the amount of heat energy to be extracted varies along the increments according to a parabolic function. Thus, at minimum cross-section (32), an increment of the length of riser containing liquid would require only a quarter of the heat energy extraction to freeze as would be required at the ends (34) and (36) if the cross sectional area at each end is twice that of the midpoint and equal length increments are considered. Freezing of water in a riser in a collector according to the already described embodiment of the invention occurs very reliably at the midpoint first in sub-zero ambient temperature test conditions. The solidification then occurs progressively outwardly towards either end, putting insignificant stress on the wall of the riser tube in the process. This is to be contrasted with observations of collectors where non-tapered copper risers and headers are included, where the tubes only survive between two to five repeat freezing/thawing cycles before bursting.

As well as the possibility of the bi-conical form of riser as illustrated in FIGS. 1 and 2, it would also be possible to taper the riser uniformly conically from one end or to form an adequate change in cross-sectional area along it, however shaped, by a progressively increasing external indentation of the riser. It is envisaged that the bi-conical riser as illustrated in FIG. 2 would be conveniently manufactured by hydraulically expanding cylindrical tubing, by hydraulic pressurisation of the interior of the tubing while the exterior is restrained in a bi-conical female die form. The externally indented variant can be formed using a female die form and a male die that increases in cross-sectional size along its length. Alternatively, a spinning process may be used.

The riser tubes of the invention may tend to impose more restriction to liquid flow than those uniform diameter risers as are already well known because the tapering involves reduction of the minimum cross-section rather than enlargement of the maximum cross-section. This restriction is considered no disadvantage because a restricted flow rate through a collector such as to approach one storage tank volume flow-through per solar day has been elsewhere demonstrated to tend to improve solar contribution as a whole compared with the more usual higher collector flow rates.

Figure 3A:
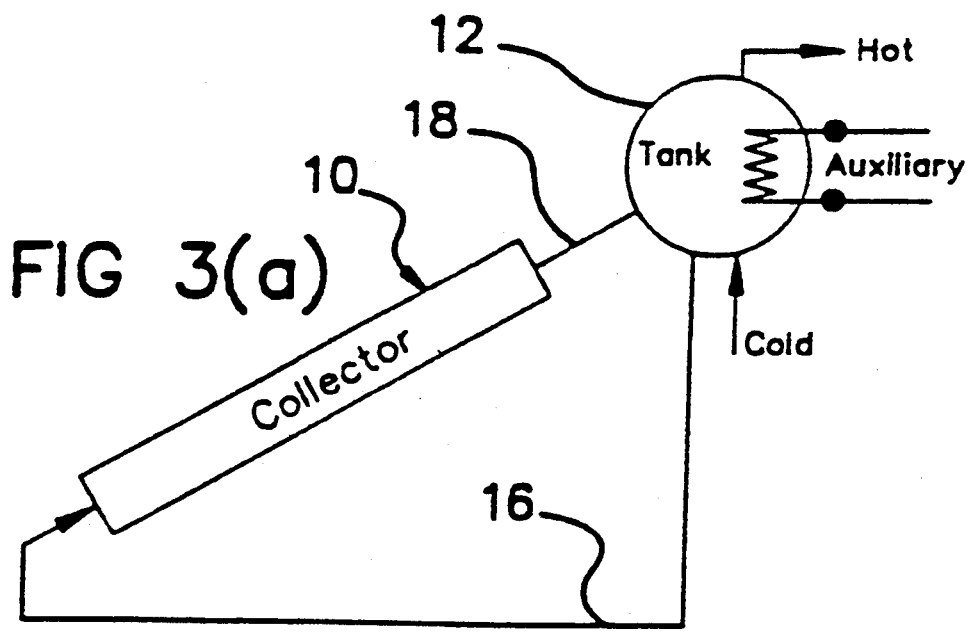
FIGS. 3 (a), (b), (c) and (d) are schematic sketches of collector and tank arrangements in which the present invention may be applied.
Figure 3B:
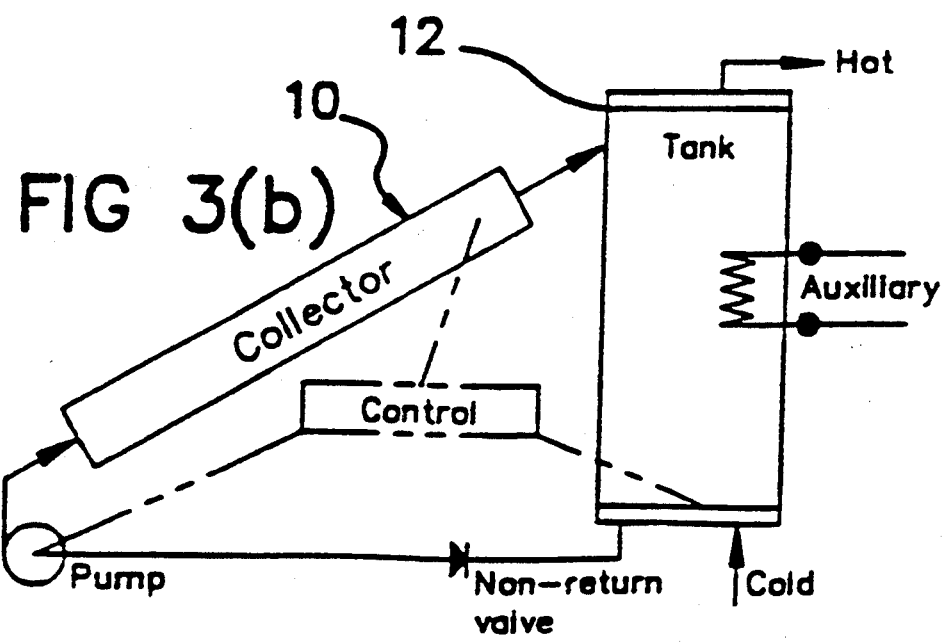

In typical solar water heater system installations as illustrated in FIG. 3, the tank must, according to plumbing codes, be fitted with an over temperature and pressure relief valve (not illustrated). In the portion of the collector circuit remaining liquid filled pressure increase, inevitable as a result of freezing in the risers, is accommodated by the transference of that pressure to the tank (FIGS. 3(a), 3(b)) at which the relief valve will open if necessary. In the indirect systems of FIGS. 3(c) and 3(d) an expansion vent and a blow out plug must be provided in the collector loop. However, in any of the FIG. 3 systems, experience demonstrates that greater need for pressure relief in the liquid filled parts of the a circuit comes from over temperature summer day time situations than at times of freezing in winter.

Figure 5:
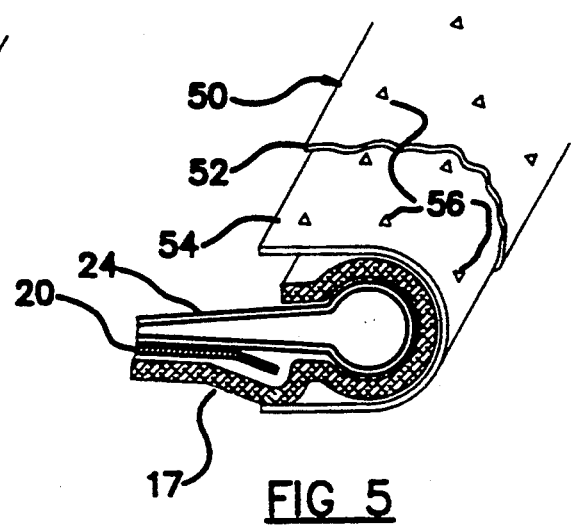
FIG. 5 is a detail cross sectional view of a portion of the collector of FIGS. 1 and 2.

In the collector of the invention it is advantageous in terms of extending the time to freeze to increase the size of the header pipes (22) and (26) above that normally considered necessary simply on the basis of fluid flow requirements. In a collector where risers with a minimum diameter of 10 mm are used with an expanded diameter at either end of 16 mm, it is desirable to use 25 mm nominal pipe size for each header. The thermal capacity of water contained in a 25 mm header of the invention would be adequate to melt all the ice that could expand from all the risers in the array if all froze solid. With a sufficient thickness of full heat insulation around the headers, the rate of heat loss from the header pipe would be extremely slow even at times of prolonged and severe sub-zero temperatures. The collector can be made extremely resistant to the damaging effects of freezing, even in very cold climates where solar energy water heating has hitherto not been considered seriously for the combined reasons of only marginal insolation and concern about freeze protection. It is considered for example, that a thickness of full insulation of 25 mm around headers of 25 mm diameter would be sufficient for virtually all situations where solar water heating is feasible. It should be noted that in FIG. 2 the absorber plate 20 does not connect with or touch the headers 24 or 26. This particularly preferred feature is adopted to prevent the plate conducting heat from the header which, if permitted, can accelerate the formation of ice lumps in the header. Ice lumps could block the header and accelerate bursting. In order to minimise this possibility, a space from about 5 to about 40 mm is left between the header and the adjacent edge of the absorber plate. As best seen in FIG. 5, this can be conveniently achieved by bending the edge of the plate 20 away from the header 26 (see also FIG. 2).

The header may be alternatively or in addition protected from freezing by connecting each riser to the header by a short length (e.g. 40 mm) of tube having a much lower coefficient of thermal conductivity than the commercially pure copper tube generally used. One preferred material is a 90:10 copper:nickel alloy since this has a coefficient of thermal conductivity only 10% of that of pure copper. The riser tubes may be formed entirely from this alloy. In addition, the wall thickness of the risers within about 40 mm of the intersection with the headers may be minimised to reduce their ability to conduct heat out of the risers. To some extent this objective is met when each riser is formed by an expanding process starting with a cylindrical tube having a bore diameter of about the minimum required and stretching the ends to a larger diameter, so thinning the walls near each end.

Other heat loss from the header can be minimised by interposing a radiation heat shield 50 (FIG. 5) which may be formed of a metal sheet, for example stainless steel, between the fully insulated header and at least its skyward facing surface.

In one illustrative form of construction as shown in FIG. 5, the header may be fully insulated by extending the heat insulation sheet 17 underlying the plate to wrap around each header and may be further insulated by retention to be retained thereto by the heat shield 50. The heat shield in one preferred form may comprise two parallel sheet surfaces 52, 54 separated by an air gap up to about 10 mm maintained by spacer dimples 56 up to 10 mm and formed in a U-shape to form an elongated retaining clip not shorter than the header to hold the compressible and springy heat insulation 17 around its associated header. Other spacer dimples 56 formed outwardly function to keep the heat shield 50 from conducting heat to the glazing 15 (FIG. 1).

Any other form of connection to the headers that may lead to heat loss by any mechanism is to be avoided. For example, where each header is blanked-off at its end opposite to the liquid connection end the presence of a bulky metallic blanking-off plug may have a heat sink effect that accelerates local freezing, in order to overcome any effect of potential ice formation associated with such heat sink effect a preferred feature is as shown schematically associated with the lower header 22 in FIG. 1 in which a relatively non-heat-conductive short conical insert. 58 is positioned in each header extending from the inside end of such plug or other closure and extending a short distance (not more than the distance from the plug to the closest connection point with a riser) into the riser, the cone pointing inwards. This functions to cause any ice growth to form closest to the plug and to grow linearly inwardly toward the closest riser/header interconnection. Analagously to the tapered riser concept, the tapered insert facilitates linear ice growth in a manner than avoids or at least delays stressing the header to the point where it could be damaged.

Experiments combined with a computer simulation indicate as a guide the estimated time to freezing of water filled headers used in collectors according to the invention as a function of variables as tabuled below. The column "time to freeze" for the given conditions indicate a role for the invention in very cold climates. The figures further indicate the benefit of closed cell foamed polyurethane heat insulation in particularly cold conditions.

| Ambient Temp. °C. | Initial header temp-°C. | Header diameter mm | Header insulation thickness mm | Insulation thermal conductivity W/m/°K. | Time to freeze, hours |
| --- | --- | --- | --- | --- | --- |
| −5 | 15 | 20 | 20 | .042* | 51 |
| −5 | 15 | 20 | 10 | .042 | 33 |
| −15 | 15 | 20 | 20 | .042 | 17 |
| −15 | 15 | 25 | 25 | .042 | 27 |
| −15 | 15 | 25 | 25 | .023** | 49 |
| −25 | 15 | 25 | 25 | .023 | 29 |

*foamed polyethylene
**closed cell foamed polyurethane

The system as illustrated in FIG. 1 is considered particularly advantageous in use in a pressurised, direct-heated potable water system. That is, potable water flows through the collector, and a secondary heat transfer fluid is not used. The system as illustrated in FIG. 1 is also shown schematically in FIG. 3 (a) and is generally termed a natural circulation system. The present invention is not precluded from advantageous use in the other type of common configurations of water heaters as illustrated in FIGS. 3 (b), (c) and (d). FIG. 3 (b) illustrates a single tank forced circulation system. FIG. 3 (c) illustrates a system with an anti-freeze loop and an internal heat exchanger. FIG. 3 (d) illustrates a system with an anti-freeze loop and an external heat exchanger. Any of the variety of arrangements for providing auxiliary heat to the tank may be used and whether or not included is not relevant to the present invention.

In systems employing an anti-freeze in water solution, the present invention would be useful to enable minimisation of the concentration of anti-freeze used in the solution or, would be capable of maximising the freeze protection available in situations of extreme and prolonged cold weather in, for example, ski resorts.

Figure 4A:
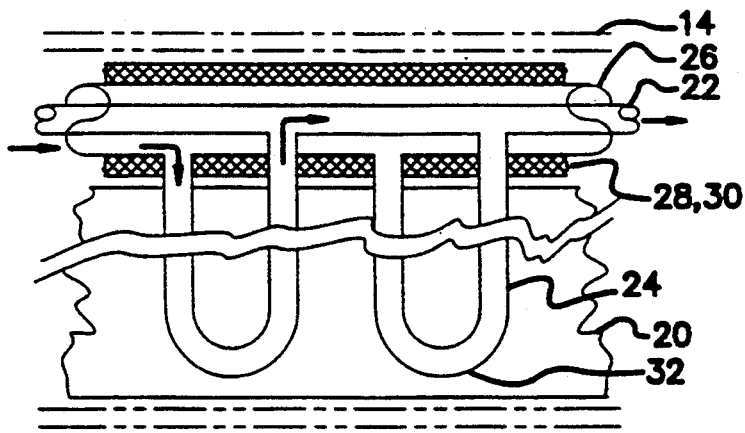
FIGS. 4 (a), (b) and (c) show alternative schematic diagrams of collector details in which the present invention may be applied.
Figure 4B:
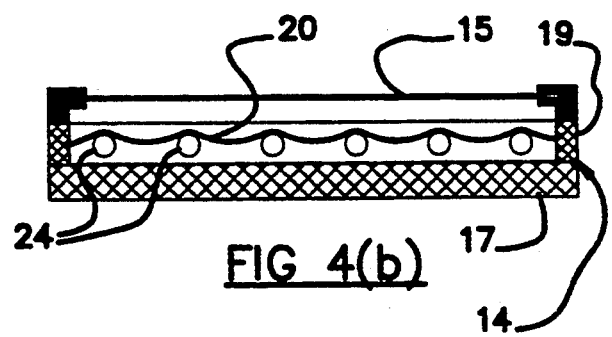
Figure 4C:
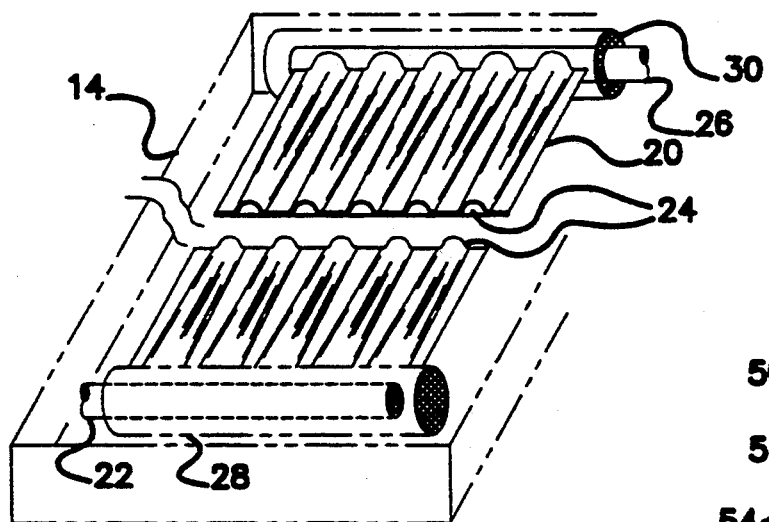

FIG. 4 (a) shows an alternative construction. Whereas the present invention would normally require straight risers (24) it would be possible to apply the concept of tapered risers to non-straight risers as shown by the illustrated U-shaped risers (24). As with the straight risers on FIGS. 1 and 2 the minimum cross-sectional area (32) coincides with the location of the midpoint. The tubes (24) could be manufactured straight initially then bent around a mandrel to form the U-shape or could be made in sections and joined. The headers could be constructed to lie within a single layer of full heat insulation.

FIG. 4 (b) illustrates both the possibility that the so-called "flat" plate (20) need not be strictly planar but may be corrugated and the tubes (24) may be fixed to the underside of the plate (20).

FIG. 4 (c) illustrates the possibility that the flat plate (20) and risers (24) can be constructed from opposed flat sheets in which the areas to remain flat are bonded and the liquid ways (risers) (24) are unbended, thence formed by hydraulically expanding them to a predetermined amount of taper. The risers may have their (single) minimum cross-section at the connection point to one or other header. Alternatively, the riser taper direction may alternate across the plate/riser array.

I claim:

1. A solar collector having liquid conduits comprising at least one tapered riser having a minimum cross-sectional area and communicating at its opposite ends with headers, each of said headers being enclosed within insulation, the taper of said riser being effective to prevent bursting of said riser caused by freezing of liquid therein by promoting initial freezing of such liquid in a localized region of such riser at its minimum cross-sectional area followed by progressive travel of the freezing of the liquid in a direction away from the localized region, said insulation being effective to delay total freezing of liquid in said headers.

2. The solar collector according to claim 1 wherein the minimum cross-sectional of said riser is between its opposite ends.

3. The solar collector according to claim 1 wherein the taper of said riser is linearly uniform.

4. The solar collector according to claim 1 wherein the minimum cross-sectional area is between its opposite ends and wherein said riser has its maximum cross-sectional area at its opposite ends.

5. The solar collector according to claim 1 wherein said riser is U-shaped.

6. The solar collector according to claim 5 wherein the minimum cross-sectional area of said riser is midway between its opposite ends.

7. The solar collector according to claim 1 wherein said riser is a tube having its minimum cross-sectional area at one end.

8. The solar collector according to claim 7 wherein said tube communicates with one of said headers at said one end of said tube.

9. The solar collector according to claim 8 wherein said headers are vertically spaced and wherein said one end of said tube communicates with the upper one of said headers.

10. The solar collector according to any of claims 1–9 wherein said riser has a maximum cross-sectional area in the range of 2 to 4 times that of the minimum cross-sectional area.

11. The solar collector according to any of claims 1–9 wherein the cross-sectional area of headers is equivalent to that of a 25 mm bore cylindrical tube.

12. The solar collector according to any of claims 1–9 including a collector enclosure within which the headers are accommodated.

13. The solar collector according to any of claims 1–9 in which at least one of said headers has a blanked-off end, and a tapered, conical plug extending inwardly from said end to a distance not beyond a point at which said riser communicates with said header.

14. The solar collector according to any of claims 1–9 in which at least one of said headers is further enclosed by radiation shielding means.

15. The solar collector according to claim 14 wherein said radiation shielding means comprises spaced apart sheets.

16. The solar collector according to claim 14 wherein said sheets are formed of stainless steel.

17. The solar collector according to any of claims 1–9 including a plurality of said risers.

* * * * *